May 29, 1962

M. D. SAYRE 3,036,504

SCREW CONVEYOR VARIABLE LIMIT APPARATUS

Filed Dec. 3, 1959

INVENTOR.
MARVIN DANA SAYRE.

BY Lowell & Henderson

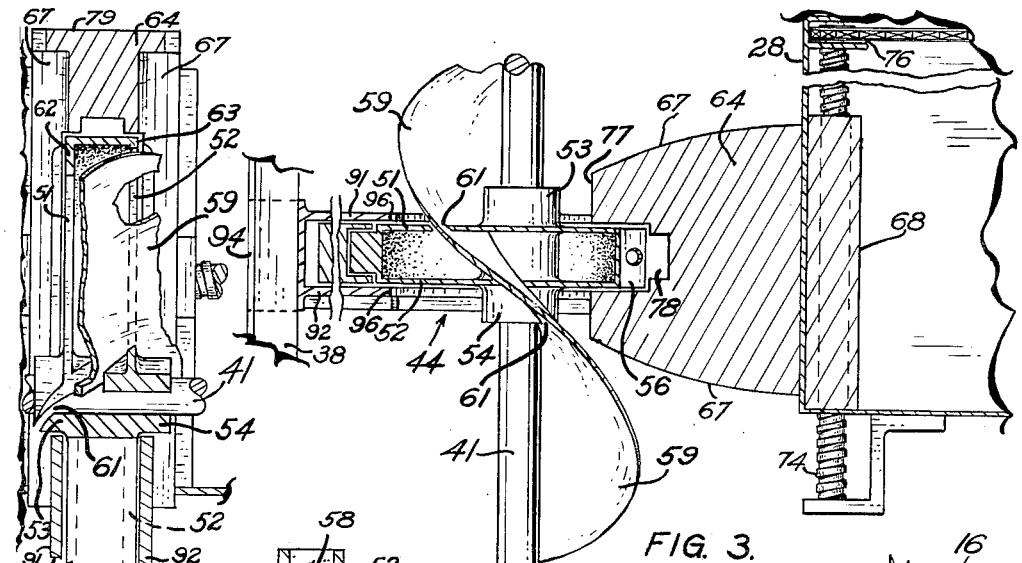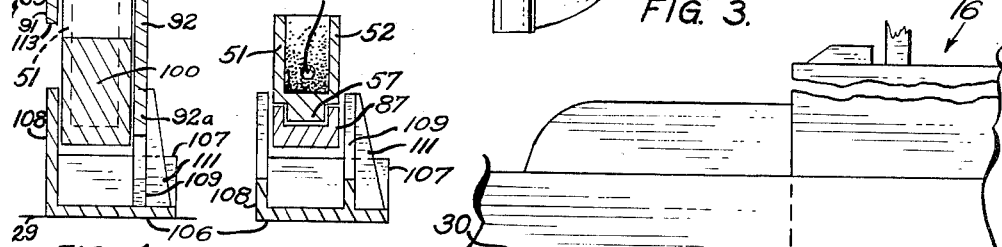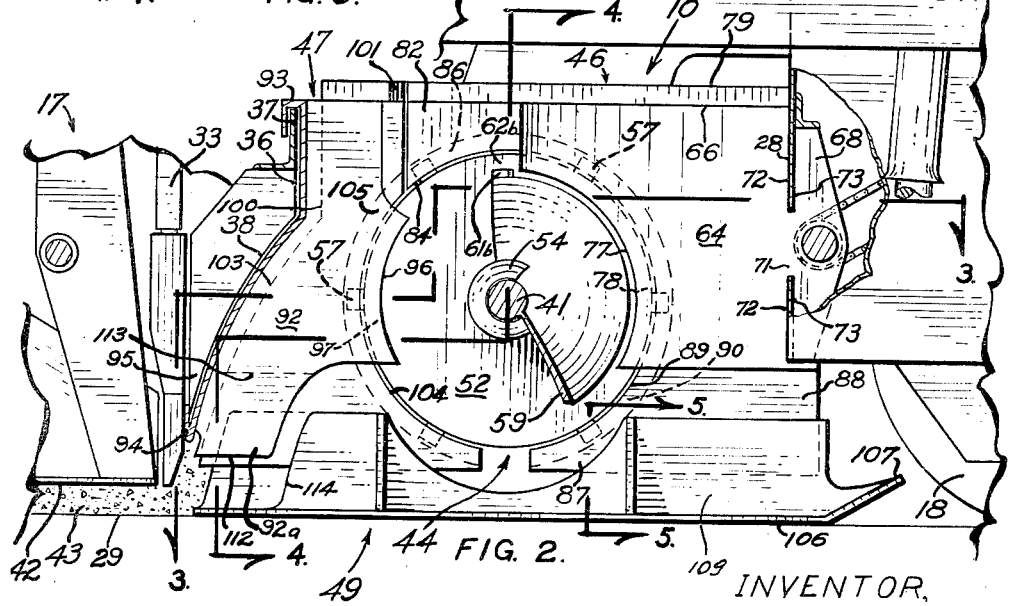

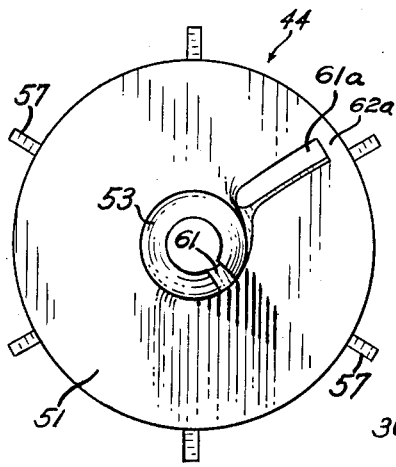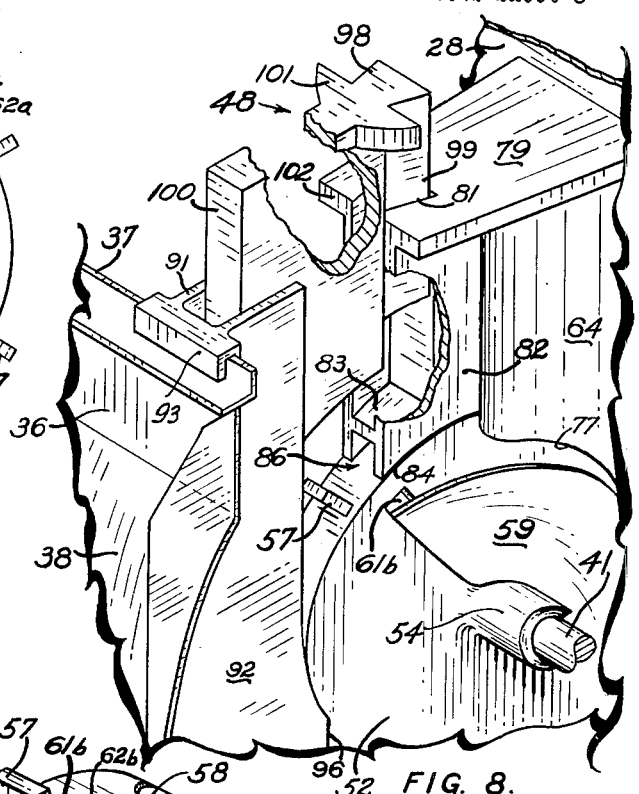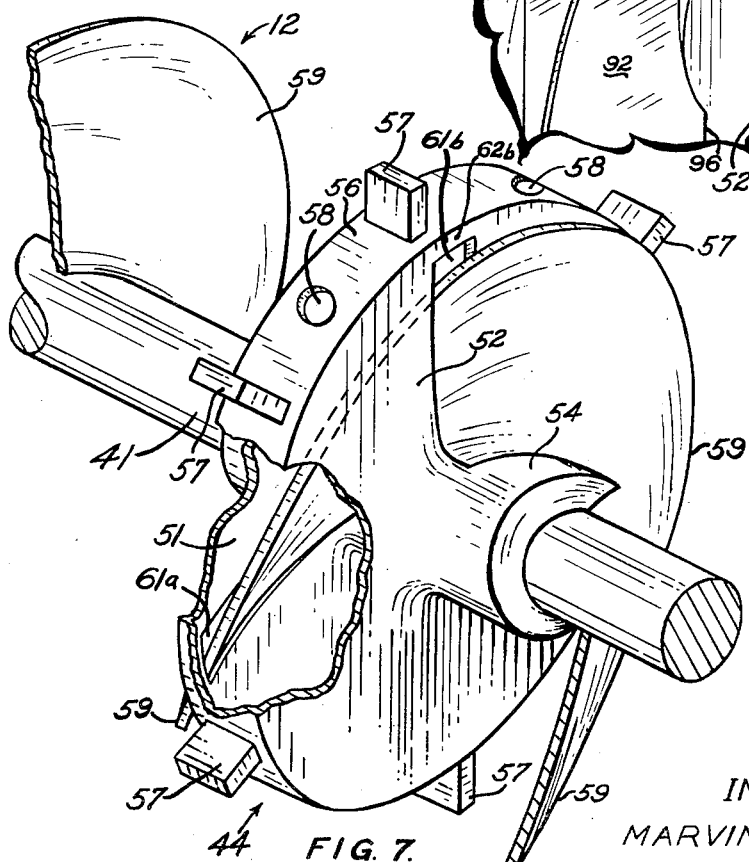

INVENTOR,
MARVIN DANA SAYRE.
BY Lowell & Henderson

United States Patent Office 3,036,504
Patented May 29, 1962

3,036,504
SCREW CONVEYOR VARIABLE LIMIT APPARATUS
Marvin D. Sayre, 107 E. 11th St., Atlantic, Iowa
Filed Dec. 3, 1959, Ser. No. 856,956
6 Claims. (Cl. 94—46)

This invention relates to material laying machines of the road finishing type utilizing helical screws for material conveying purposes, and more particularly to means mounted on said screws for longitudinal movement therealong for varying the conveying distance of said helical screws while maintaining the dimensions of the width of the laid materials equal to the conveying distance.

Although the conventional road finishing machine is arranged to lay a fixed width of material along a roadway surface, in many instances it is desirable and necessary to vary the fixed width, either making it wider or more narrow. To accomplish particularly the narrowing of the width of a mat of road material laid, the machine must be stopped and the entire operation halted. According to one method of accomplishing this change, as described in Patent No. 2,289,168, issued July 7, 1942 to H. H. Barber and entitled Cutoff Shoe for Road Finishing Machines, certain side plates must be adjusted, certain attachments as cutoff shoes must be assembled in place, and certain end sections of the helical screw conveyor must be rendered inoperative.

Notwithstanding the stoppage of operation while these changes take place, which changes require considerable physical effort and which stoppage decreases the efficiency of the finishing operation due to the material mixture behavior; according to the teachings of the patent referred to, the cutoff structure while limiting or varying the width of the mat being laid does not likewise limit or vary the conveyed width of the material precisely according to the mat. The net result is an appreciable accumulation of material on top of the installed cutoff shoes, which hardens as a waste and also as an obstruction for the cutoff attachment the next time it is used.

It is therefore an object of this invention to provide a novel apparatus for varying the conveying distance of a helical screw.

It is another object of this invention to provide a novel apparatus for varying the conveying distance of a helical screw embodied in a road finishing machine, and simultaneously varying the width of a mat being laid down by the machine to the same dimension as that of the conveyed material.

A further object of this invention is to provide for a road finishing machine employing a pair of independently driven screw conveyors, a pair of independently operated apparatus for limiting and varying the conveying distances of the screw conveyors and the laying distance of the machine to the same extent.

Yet another object of this invention is to provide an apparatus capable of attaining the above-mentioned objects and wherein the mat edges formed during the operation can be transitionally controlled without stopping the forward movement or operation of the machine.

Another object of this invention is to provide an apparatus for a screw conveyor utilized for moving material through an open-bottomed trough, which apparatus is embodied as original equipment integral with a road finishing machine and which is mounted on the screw conveyor at right angles to the longitudinal axis thereof for providing a partition therefor above the trough, which partition is movable longitudinally of the conveyor to a plurality of stationary positions for varying the conveying distance thereof.

A further object of this invention is to provide an apparatus extended perpendicular to the longitudinal axis of a screw conveyor and adapted to have said screw conveyor extend therethrough, to remain stationary with respect to the longitudinal axis of the screw conveyor while the screw conveyor rotates, or to be axially rotated whereby to move along the longitudinal axis of said screw conveyor whether or not the screw conveyor is rotating, with the function of the apparatus being that of limiting the conveying distance of the screw conveyor according to its longitudinal position thereon.

It is another object of this invention to provide an apparatus for a screw conveyor embodied in a road finishing machine which apparatus is adapted to have the screw conveyor extended therethrough, whereby in addition to providing an insulated partition for varying and limiting the conveying distance of the screw conveyor and wherein the insulating characteristics minimize a hardening of the material contacted thereby, the apparatus acts as a bearing unit for supporting the screw conveyor.

A further object of this invention is to provide an apparatus capable of attaining the above-mentioned objects which is economical of manufacture, rugged of structure, and effective in operation.

These and other objects, features and advantages will be more apparent by reference to the following description when taken in conjunction with the accompanying drawings, wherein:

FIG. 2 is a fragmentary, enlarged side elevational view of a portion of the machine of FIG. 1, certain parts being foreshortened and broken away for the purpose of clarity;

FIG. 3 is a horizontal cross sectional view taken along the line 3—3 in FIG. 2, with certain parts foreshortened for clarification;

FIG. 4 is a vertical cross sectional view taken along the line 4—4 in FIG. 2, with certain parts being broken away for the purpose of clarity;

FIG. 5 is a vertical cross sectional view taken along the line 5—5 in FIG. 2;

FIG. 6 is a detail side elevational view of a partition for the road finishing machine;

FIG. 7 is an enlarged, fragmentary perspective view of a partition and a portion of a conveyor screw for the machine in assembled relation, with certain parts broken away for purposes of clarity;

FIG. 8 is an enlarged, fragmentary, perspective view of a portion of a carrier assembly for a partition, with certain parts moved slightly out of their normal position and with others broken away for clarification.

Figure 1:
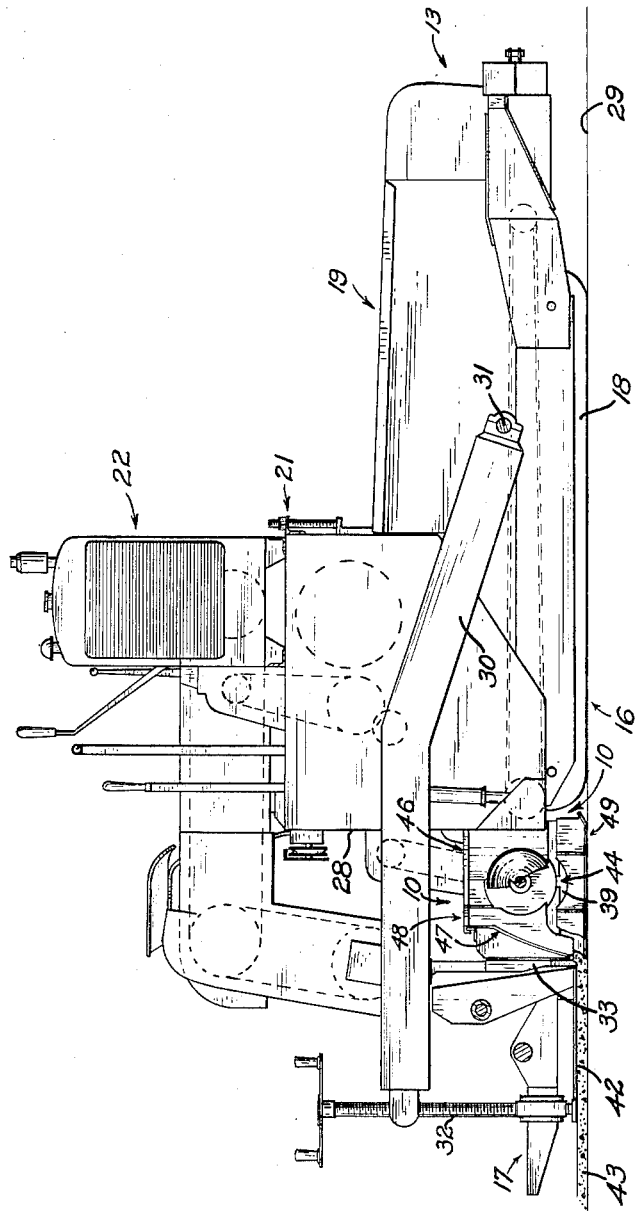
FIG. 1 is a side elevational view of a road finishing machine embodying the present invention.
Figure 9:
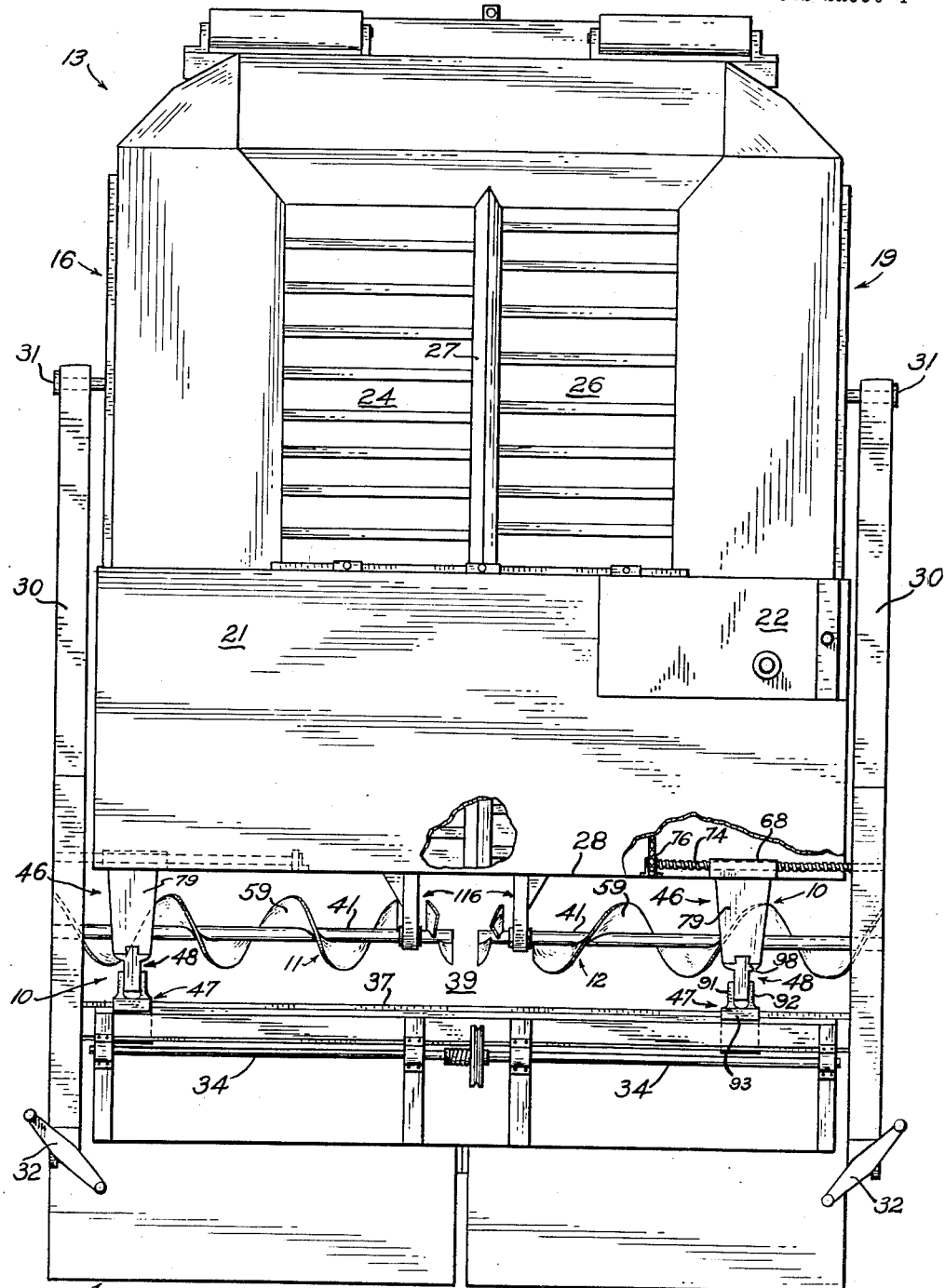
FIG. 9 is an enlarged, top plan view of the road finishing machine of FIG. 1, with certain parts broken away to more clearly show the invention.

Referring now to the drawings, a pair of variable limit apparatus with which this invention is primarily concerned are each indicated generally at 10 in FIGS. 1 and 9, and are shown as applied to a pair of left and right hand screw conveyors 11 and 12 for a road finishing machine 13.

The machine 13 comprises a self-propelled tractor assembly 16 (FIG. 1) and a screed assembly 17 movably mounted to the rear of the tractor assembly 16. A pair of crawlers 18 (only one showing) are included as a part of the tractor assembly and have mounted thereon framework defining a platform 19 for receiving road finishing material dumped from a truck (not shown) located in front of the machine 13. Another platform 21 is mounted above the rear of the platform 19 for supporting an engine 22 thereon.

Referring particularly to FIG. 9, the platform 19 includes a pair of flights 24 and 26, separated by means of a longitudinal skirt 27, and driven by conveyor means (not shown). The flights may be driven at different rates and serve to convey material dumped on the front portion of the platform 19 to the rear thereof, the rear being defined by a vertically disposed bulkhead 28, and onto the road bed 29 between the rear end of the tractor assembly 16 and the forward end of the screed assembly 17.

A pair of side arms 30 are pivotally connected at 31 to the front of the tractor assembly 16 and extended to the sides of the screed assembly 17, whereat a pair of adjusting screws 32 are mounted for controlling the screed assembly 17. A pair of laterally aligned tampers 33 (FIG. 1) are eccentrically suspended and driven by means of transversely extended shafts 34. The shafts 34 are rotated by transmission means from the engine 22 to reciprocate the tampers 33 and to cause them to compress and tamp the road material fed to the road bed 29 by the conveyor flights 24 and 26. A deflector plate or bulkhead 36 (FIG. 2) having an upper horizontally disposed edge 37 which extends transversely of the machine 13, and the forward edge 38 of which curves rearwardly is suspended in front of the tampers 33 whereby to define with the bulkhead 28, an open-ended chamber or trough 39 (FIG. 9), bottomed by the road bed 29. It is seen that the screw conveyors 11 and 12 are rotatably mounted on axles or shafts 41 above the road bed 29 to spread the road material deposited in the trough 39 laterally across the entire width of the machine 13.

A raising and lowering of the adjusting screws 32 by the side arms 30 serves to tilt the screed assembly 17 and a bottom wall 42 therefor to produce either a thinner or a thicker mat 43 of road material. As the deflector means 36, the tampers 33 and the screed 17 are all suspended from the side arms 30, these parts operate in unison and the tampers 33 are automatically raised or lowered as determined by the position of the screed 17.

The screw conveyors 11 and 12 (FIG. 9) receive the road material dumped into the open-bottomed trough 39 by the flights 24 and 26 and are of a length such that the machine 13 lays a mat having a width which is normally ten feet. To vary the width of the mat, and to maintain the width of the mat in a fixed relation—such as being equal—to the distance the conveyors convey the material transversely of the machine 13, whereby the mat edges can be transitionally controlled during and while the machine is being operated to perform the lay-down operation, is the prime purpose of each variable limit apparatus 10.

As both pairs of apparatus 10 and their structural application to the machine 13 are identical, only one will be described, with like reference numerals indicating like parts.

The apparatus 10 applied to the screw conveyor 12 (FIG. 9) comprises generally: a limiting wall or partition unit 44 (FIG. 2) mounted on the shaft 41 of the screw conveyor 12; a unit 46 mounted on the bulkhead 28 of the tractor assembly 16 for powered, sliding movement therealong in a direction parallel to the shaft 41; a follower unit 47 slidably mounted on the upper edge 37 of the screed bulkhead 36; a unit 48 for horizontally interlocking the mounting unit 46 and the follower unit 47 whereby transverse movement of the unit 46 causes a like movement of the interlocking unit 48 and the follower unit 47; and a shoe unit 49 adapted for contacting engagement with the road bed 29 and also for co-acting engagement with the lower portions of both the mounting and the interlocking units 46 and 48, respectively.

The partition unit 44 comprises a pair of transversely spaced circular discs or plates 51 and 52 (FIG. 7) each having integral therewith a hub 53 and 54 (FIG. 3) respectively, the hubs being integrally joined at the center of the unit 44. A circular, flat band 56 connects the peripheries of the plates 51 and 52, and includes a plurality of radially extended lugs 57. The band 56 also has a plurality of openings 58 (FIG. 7) formed therein.

To provide for the mounting of the partition unit 44 on the axle 41 of the screw conveyor 12, whereby the flighting 59 of the conveyor extends through the unit 44, a continuous slot 61 is formed in the unit. The slot 61, FIGS. 3, 4, 6 and 7, begins at the outer end of one hub 53 and extends in a spiral manner longitudinally of and completely through the hubs 53 and 54 to the outer end of the hub 54, with arcuately spaced, radial extensions 61a (FIG. 6) and 61b (FIG. 7) of the slot formed in each plate 51 and 52, respectively. The walls of and defining the slot 61 are spaced apart, and are formed spirally so as to have the same degree of pitch as the screw conveyor flighting 59 at any corresponding point on the latter, so that the flighting 59 is readily extendable through the slot 61. The slot extensions 61a and 61b stop short at their outer ends of the peripheral band 56 whereby marginal portions 62a (FIG. 6) and 62b (FIG. 7) remain in the respective plates 51 and 52.

The mounting unit 46 includes a solid mounting member 64 (FIG. 2) having a flat upper surface 66, curved sides 67 (FIG. 3) and a front portion 68 (FIG. 2) having vertically aligned and spaced notches for receiving the bulkhead 28, whereby the member 64 is adapted to slide along a horizontal slot 71 formed in the bulkhead 28 parallel to the shaft 41 of the screw conveyor 12. By this arrangement, the front surface 72 of the member 64 and the back surface 73 of the front portion 68 are both adapted to slide along the rear and front sides, respectively, of the bulkhead 28, as best viewed in FIG. 2, whereby the mounting member 64 is slidably hung on the bulkhead 28. A worm drive gear 74 (FIGS. 3 and 9) driven by a sprocket 76 driven off the power train for the machine, is provided for co-action with an internally threaded bore formed in the front portion 68 of the mounting member 64 to move the mounting member back and forth on the bulkhead 28.

The rear face 77 (FIG. 2) of the mounting member 64 is curved in a manner complementary to the peripheral curvature of the partition unit plates 51 and 52, and has formed therein a groove 78 of a dimension such that the marginal portions 62a and 62b of the partition unit 44 extend within the groove 78. The mounting unit 46 includes further a flat top plate 79 integral with the top of the mounting member 64 and extended rearwardly thereof, a key slot 81 (FIG. 8) being formed at the rear end of the plate 79, and formed also in a vertical manner in a rear portion 82 of the mounting member 64. The curved bottom 83 (FIG. 8) of the key slot 81 defines the top of a groove 86 (FIG. 2) formed in the rear portion 82 through which the lugs 57 of the partition unit 44 are adapted to move, the groove 86 joining with the groove 78 in the mounting member 64. The lower curved edges 84 (FIGS. 2 and 8) of the portion 82 are curved in a manner complementary to the peripheral curvature of the partition unit plates 51 and 52 and contiguous with the surface of the band 56 so as to act as a bearing therefor. At the base of the mounting member 64, another guide member 87 (FIG. 2) is secured thereto, and which includes a forward portion 88 extended beneath and in front of the bulkhead 28 (FIG. 2), the rear curved face of the guide member 87 also having curved edges 89 of a complementary nature with the partition unit plates 51 and 52 and defining a groove 90 through which the lugs 57 of the partition unit rotate.

It may thus be seen, that as the grooved mounting member 64 extends, by virtue of the groove 78, on both sides of the partition unit plates 51 and 52 at their marginal portions 62a and 62b, movement of the mounting member 64 in either direction transversely of the machine 13 forces the partition unit 44 to also move in the same direction as that of the mounting member 64; and by virtue also of the pair of grooves 86 and 90 within which the lugs 57 extend, further guide means is provided by the mounting unit 46. Additionally, the guide members 82 and 87 cooperate with the mounting member 64 to partially close the open end of the trough 39 (FIG. 2).

In addition to the guiding force of the mounting member 64 acting on an arcuate forward portion of the partition unit 44, a guiding force acting on an arcuate rear portion of the unit 44 is provided by the follower unit 47. This unit 47 includes a pair of transversely spaced, flat members 91 and 92 (FIGS. 8 and 9), integrally joined at their rear edges which are curved to conform to the forward edge 38 (FIG. 2) of the bulkhead 36 for the screed assembly 17. The members 91 and 92 are connected at their tops by an inverted, U-shaped member 93 adapted to ride on top of the upper edge 37 of the bulkhead 38, and are provided adjacent their rear lower ends with an upwardly extended lip 94 adapted to be inserted behind the lower end 95 of the bulkhead 36, whereby the members 91 and 92 are hung as a unit on the bulkhead 36 for sliding movement therealong in a direction parallel to the longitudinal axis of the shaft 41 for the screw conveyor 12. Whereas the inner member 91 (FIG. 4) does not depend the full radius of the unit 44, it is noted the outer member 92 includes a portion 92a that does depend substantially the full radius of the unit 44.

The members 91 and 92 are transversely spaced such that their forward curved edges 96 (FIG. 2) define a groove 97 extended on both sides of the unit 44 and over the marginal portions 62a and 62b thereof. By interlocking the follower unit 47 with the mounting unit 46 in the manner hereinafter described, upon movement of the mounting unit 46 transversely of the machine or longitudinally of the screw conveyor axle 41, guiding forces are applied on both the forward and rearward sides of the partition unit 44 (FIG. 2).

To provide such interlocking between the mounting unit 46 and the follower unit 47, the unit 48 is provided which includes a key wedge 98 (FIG. 8). The wedge, shown in FIG. 8 in an abnormally raised position for illustrative purposes, includes a front vertical shaft 99 formed to fit in the key slot 81 for the mounting member top plate 79 and is of such a height that it rests upon the bottom 83 of the slot 81, whereby a winged portion 101 of the wedge 98 is horizontally level and in contacting engagement with the rear surface 102 of the plate 79. The rear portion 100 of the wedge 98 is inserted between the flat members 91 and 92 of the follower unit 57, the rear edge 103 (FIG. 2) curved to follow the curvature of the screed bulkhead forward edge 38. The leading edge 104 of the wedge 98 is formed in a curved manner complementary to the curvature of the partition unit 44 and has a groove 105 formed therein for receiving the marginal portions 62a and 62b of the partition unit 44 therebetween.

By referring to FIG. 2, it may readily be seen that the partition unit 44 is covered at its marginal portions substantially about its entire circumference by the mounting member 64, the members 91 and 92 of the following unit 47, the guide members 82 and 87, and the wedge 98; whereby substantially the entire end of the trough 39 is closed, and whereby guide surfaces and grooves therebetween in which the lugs 57 rotate are formed on both sides of the partition unit 44. It should here be noted that the grooves and the spacing between the various guide means are such that the partition unit 44 is rotatable relative to these various guide means.

The apparatus 10 is completed by the shoe unit 49 (FIGS. 1, 2, 4 and 5) which comprises an elongated flat base 106 (FIG. 2) extended from adjacent the rear of the tractor assembly 16 to shortly in front of the tampers 33, an upwardly inclined toe 107 being provided at the front of the base 106 to accommodate irregular surfaces and objects on the roadway 29. Transversely spaced, upstanding sides 108 and 109 are secured to the base 106 and extend adjacent both sides of the mounting unit lower guide member 87 (FIG. 5), while having the same transverse spacing as the flat members 91 and 92 of the follower unit 47 (FIG. 4). The base 106 is extended shortly beyond the outer side 109 and outwardly of the closed end of the trough 39, and is strengthened by gusset plates 111 (FIGS. 4 and 5) secured to the side 109. To accommodate the depending portion 92a (FIG. 2) of the member 92, the side 109 of the shoe unit 49 is cut off at 114. Of note, the lower edges 112 and 113 of the portion 92a and the flat member 92, respectively, are sufficiently spaced above the shoe unit 49 to prevent contact therebetween during use of the apparatus 10.

In assembly, each apparatus 10 is mounted on the outer end of a screw conveyor 11 and 12 and adapted to be reciprocally moved thereon from the sides of the machine 13 inwardly a distance determined by the length of the worm gear shafts 74 (FIG. 9), the inward movement limited by the inner bearing unit 116 for the conveyors. It is here noted that in addition to providing the function of a limiting dam or partition, each apparatus 10 also acts as an outer bearing support for its screw conveyor, irrespective of its position longitudinally thereof.

In operation, each apparatus 10 is adapted to be initially located longitudinally on a screw conveyor by operation of the worm gear shaft 74 to move the mounting unit 46 transversely of the machine and longitudinally of the axle 41 for the conveyor. When a screw conveyor is not rotating, it may readily be seen that as the mounting unit 46 and the interlocking and follower units 48 and 47 move, the partition unit 44 rotates vertically relative to the screw conveyor while following the flighting 59 to move horizontally and longitudinally of the screw conveyor. The shoe unit 49, as it is carried directly below the partition unit 44 also moves longitudinally therewith upon movement of the unit 44.

Upon forward operational movement of the machine 13, the road material 43 conveyed rearwardly by the flights 24 and 26 is dumped into the trough 39 and conveyed laterally therein by the screw conveyors until the material is stopped by each partition unit 44, and the surrounding elements described hereinbefore. The material 43 is then forced to drop by gravity onto the roadway 29, where tendency of the material to spread laterally is limited by the inner side 108 (FIG. 4) of the shoe unit and forced rearwardly under the tampers 33, the edge of the mat of material being thereby defined.

By this cooperation between the partition unit 44 and the shoe unit 49, it is readily appreciated that each apparatus 10 functions not only to provide a positive limit for the edge of the mat being laid, but also to prevent any material from bleeding or spilling past and beyond the mat edge by providing an equally positive limit, in fixed relation to the width of the mat, for the conveying distance of each screw conveyor.

Yet as importantly, whereby the partition unit 44 is capable of being rotated with and by the rotation of the screw conveyor while remaining in a fixed longitudinal position thereon by virtue of the mounting arrangement, the partition unit 44 is also capable of being rotated relative to the rotation of the screw conveyor. Thus, while the machine 13 is moving forward and the screw conveyors are rotating; by operation of the worm gear shaft 74, the resulting longitudinal movement of the mounting structure for the partition unit 44 causes the unit 44 to rotate relative to the mounting structure and also to the screw conveyor so as to move longitudinally thereon. By this arrangement, the edges of the mat formed during the lay-down operation can be transitionally controlled without stopping the forward movement or operation of the machine.

A further contribution of the present invention comprises the utilization of the pair of plates 51 and 52 in spaced relation. An insulated partition is thus provided for the material 43, which ordinarily is a hot-mixed, asphaltic material. The formation of hard chunks of this material which tend to tear or disrupt the mat being laid is thus substantially eliminated.

Although a preferred embodiment of the invention has been described herein, it is to be remembered that various alternate constructions and modifications may be made within the intended scope of the invention as defined by the appended claims.

I claim:

1. A limit member for a screw conveyor having a helical flighting, said limit member having a tubular hub portion through which the axle of said conveyor rotatably extends, and having further a portion extended angularly away from said tubular hub portion, said tubular hub portion and said portion having a continuous slot formed therein and extended radially outwardly from said tubular hub portion and through which the flighting of said conveyor is movable, and means mounted circularly of said conveyor and beyond the radius of said flighting for guidably holding said portion at the periphery thereof, whereby said limit member is free to rotate with said conveyor while remaining fixed longitudinally thereof.

2. A limit member for a screw conveyor, said limit member rotatably mounted on the axle of said conveyor and extended angularly therefrom, said limit member having a continuous slot formed therein extending spirally from the conveyor axle and radially toward the periphery of said limit member and through which the flighting of said conveyor is movable, and means movable longitudinally of said axle for holding said limit member in any one of a plurality of positions along said axle, said limit member movable relative to said axle and to said holding means, whereby upon movement of said holding means said limit member is movable longitudinally of said axle irrespective of rotation of said conveyor, and whereby upon rotation of said screw conveyor, said limit member rotates relative to said holding means while remaining fixed relative to the longitudinal axis of said axle.

3. A limiting partition for a screw conveyor comprising a pair of plate members mounted in longitudinally spaced relation on the axle of said conveyor and extended angularly therefrom, means interconnecting said plate members and extended outwardly from the peripheries thereof, said plate members each having radially extended, arcuately spaced slots formed therein through which the flighting of said screw conveyor traverses, whereby said plate members are movable as a unit relative to said screw conveyor, and guide means movable longitudinally of said axle from one stationary position to another for guidably receiving said outwardly extended means, whereby said plate members are rotatable as a unit relative to said guide means.

4. In a road finishing machine having a screw conveyor mounted over an open-bottomed trough for distributing material therein, apparatus for limiting the conveying distance of said conveyor comprising, plate means rotatably mounted on the axle of said screw conveyor and extended radially outwardly therefrom beyond the radius of the flighting of said screw conveyor, said plate means having a slot formed therein through which said flighting is traversable, and guide means slidably movable on said machine for movement parallel to said axle, said guide means coacting with said plate means whereby said plate means is movable longitudinally of said axle by movement of said guide means.

5. In a road finishing machine having a screw conveyor for distributing material, said conveyor mounted over an open-bottomed trough defined by a pair of bulkheads extended transversely of said machine parallel to each other and to the axle of said conveyor, apparatus for variably limiting the conveying distance of said conveyor comprising, means including a plate surrounding said conveyor and through which said axle extends, said plate having a slot formed therein through which the flighting of said conveyor moves, and guide means selectively slidably mounted on said bulkheads for movement parallel to said axle and extended adjacent both sides of said plate at the periphery thereof, said plate freely rotatable within said guide means and about said axle, and whereby slidable movement of said guide means causes movement of said plate longitudinally of said axle.

6. In a road finishing machine having a screw conveyor mounted over an open-bottom trough for distributing material therein, said trough defined on one side by portions associated with a tractor means and on the other side by screed means pivotally connected to said tractor means for vertical movement, apparatus for varying the conveying distance of said screw conveyor during operation of said machine comprising, circular means rotatably mounted on the axle of said screw conveyor and extended radially therefrom at substantially a right angle to said axle, said circular means having slots formed therein through which the flighting of said screw conveyor is movable, said circular means being rotatable with said screw conveyor at a selectively fixed location on said axle and being rotatable relative to said screw conveyor so as to move longitudinally thereof, drive means mounted on said tractor means and movable parallel to said axle, said drive means including a first wall means secured thereto and loosely engaged with said circular means whereby said circular means is rotatable relative to said first wall means and is movable longitudinally along said axle upon actuation of said drive means, second wall means slidably mounted on said screed means and likewise movable parallel to said axle, a third wall means loosely interlocked intermediate the lower portions of said first and second walls and including ground engaging support means therefor, and fourth wall means loosely engaged with said circular means and including vertically reciprocable means interlocking said first and second wall means for simultaneous movement of each of said walls in response to actuation of said drive means to vary the width of the dispensed material.

References Cited in the file of this patent

UNITED STATES PATENTS

| | | |
|---|---|---|
| 171,907 | Kuhns | Jan. 4, 1876 |
| 310,228 | Riter | Jan. 6, 1885 |
| 2,109,020 | Abernathy | Feb. 2, 1938 |
| 2,289,168 | Barber | July 7, 1942 |